(12) United States Patent
Cazes et al.

(10) Patent No.: US 9,951,836 B2
(45) Date of Patent: Apr. 24, 2018

(54) SHOCK ABSORBER SYSTEM FOR A VEHICLE

(71) Applicant: AUTOTECH ENGINEERING, A.I.E, Amorebieta-Etxano (ES)

(72) Inventors: Christophe Cazes, Versailles (FR); Gregory Gatard, Leuville sur Orge (FR); Emmanuel Leroy, Verrieres le Buisson (FR); Matthieu Niess, Clamart (FR)

(73) Assignee: AUTOTECH ENGINEERING A.I.E., Amorebieta-Etxano (ES)

( * ) Notice: Subject to any disclaimer, the term of this patent is extended or adjusted under 35 U.S.C. 154(b) by 0 days.

(21) Appl. No.: 15/027,999

(22) PCT Filed: Oct. 9, 2014

(86) PCT No.: PCT/EP2014/071698
§ 371 (c)(1),
(2) Date: Apr. 7, 2016

(87) PCT Pub. No.: WO2015/052298
PCT Pub. Date: Apr. 16, 2015

(65) Prior Publication Data
US 2016/0245357 A1    Aug. 25, 2016

(30) Foreign Application Priority Data
Oct. 9, 2013  (FR) ...................... 13 59795

(51) Int. Cl.
*B60R 19/34* (2006.01)
*F16F 7/00* (2006.01)
*F16F 7/12* (2006.01)

(52) U.S. Cl.
CPC .............. *F16F 7/003* (2013.01); *B60R 19/34* (2013.01); *F16F 7/12* (2013.01)

(58) Field of Classification Search
CPC ................................ B60R 19/34; F16F 7/003
See application file for complete search history.

(56) References Cited

U.S. PATENT DOCUMENTS

| 3,482,653 A | 12/1969 | Maki et al. |
| 6,135,251 A | 10/2000 | Hartlieb et al. |

(Continued)

FOREIGN PATENT DOCUMENTS

| DE | 10257262 A1 | 6/2004 |
| DE | 102013002503 A1 * | 8/2014 ............ B62D 21/15 |

(Continued)

OTHER PUBLICATIONS

Translation of the Written Opinion for PCT/EP2014/071698, dated Apr. 16, 2015, 5 pp.

(Continued)

*Primary Examiner* — Pinel E Romain
(74) *Attorney, Agent, or Firm* — Squire Patton Boggs (US) LLP

(57) ABSTRACT

The present invention relates to a shock absorber system for a vehicle comprising a main unit (100) adapted to be deformed in the event of an impact with a first energy level and a secondary unit (200) shorter in length than the main unit (100), adapted to be subjected to loads as a complement of the main unit (100), after a first deformation phase of the main unit (100), when the system receives an impact with a second energy level greater than the first, the secondary unit (200) being configured to orient the resultant of a force applied on a downstream structure (30) in a direction not parallel to the longitudinal axis of this downstream structure.

15 Claims, 19 Drawing Sheets

(56) References Cited

U.S. PATENT DOCUMENTS

| | | | |
|---|---|---|---|
| 6,179,355 B1 | 1/2001 | Chou et al. | |
| 6,282,769 B1 | 9/2001 | Longo et al. | |
| 6,908,129 B2 * | 6/2005 | Shimotsu | B60R 19/34 |
| | | | 293/132 |
| 6,932,201 B2 | 8/2005 | Akiyama et al. | |
| 7,357,445 B2 * | 4/2008 | Gross | B62D 21/152 |
| | | | 188/377 |
| 7,625,036 B2 * | 12/2009 | Cormier | B60R 19/18 |
| | | | 293/102 |
| 8,757,687 B2 * | 6/2014 | Kaneko | F16F 7/12 |
| | | | 188/377 |
| 2002/0101086 A1 | 8/2002 | Koch et al. | |
| 2003/0057719 A1 | 3/2003 | Yamagiwa | |
| 2004/0060791 A1 | 4/2004 | Akiyama et al. | |
| 2005/0211520 A1 | 9/2005 | Abu-Odeh et al. | |
| 2005/0269824 A1 | 12/2005 | Steeg et al. | |
| 2006/0237976 A1 * | 10/2006 | Glasgow | B21C 37/158 |
| | | | 293/132 |
| 2007/0055258 A1 | 3/2007 | Hansen | |
| 2012/0032459 A1 | 2/2012 | Fang et al. | |
| 2013/0119705 A1 | 5/2013 | Matuscheck et al. | |
| 2016/0068125 A1 * | 3/2016 | Wendel | B60R 19/26 |
| | | | 293/133 |

FOREIGN PATENT DOCUMENTS

| | | |
|---|---|---|
| FR | 2844321 A1 | 3/2004 |
| FR | 2876646 A1 | 4/2006 |
| FR | 2888545 A1 | 1/2007 |
| FR | 2903061 A1 | 1/2008 |
| FR | 2803571 A3 | 7/2011 |
| JP | 2004345466 A | 12/2004 |
| JP | 2008202714 A | 9/2008 |
| JP | 2011063191 A | 3/2011 |
| WO | WO 2006/042974 A1 | 4/2006 |

OTHER PUBLICATIONS

International Search Report for related PCT Application No. PCT/EP2014/071698, dated Mar. 26, 2015, 2 pp.

* cited by examiner

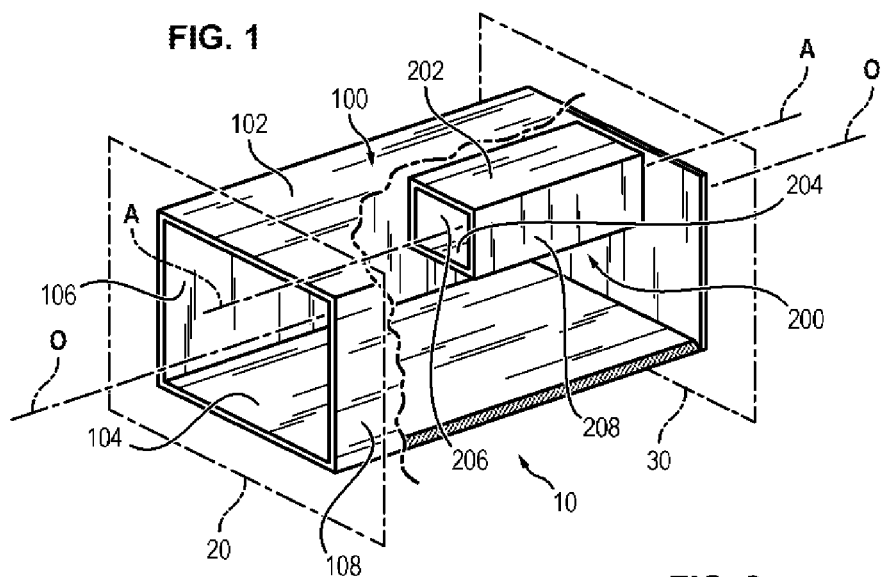
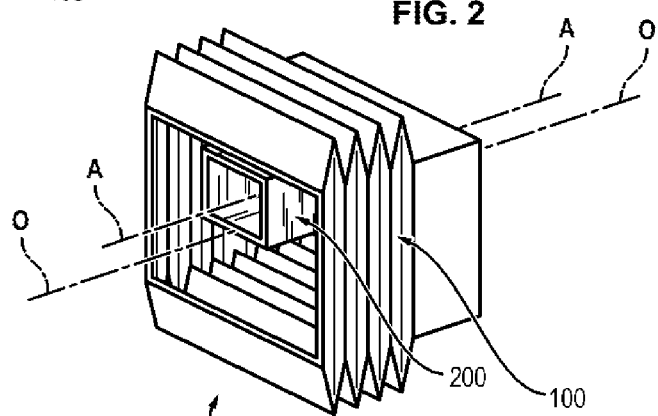
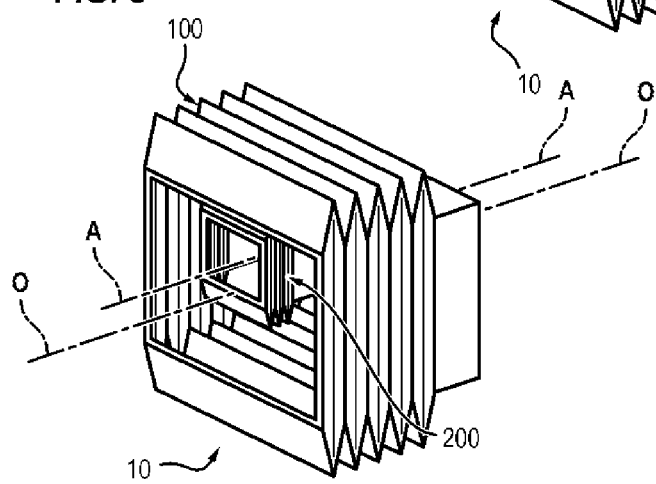

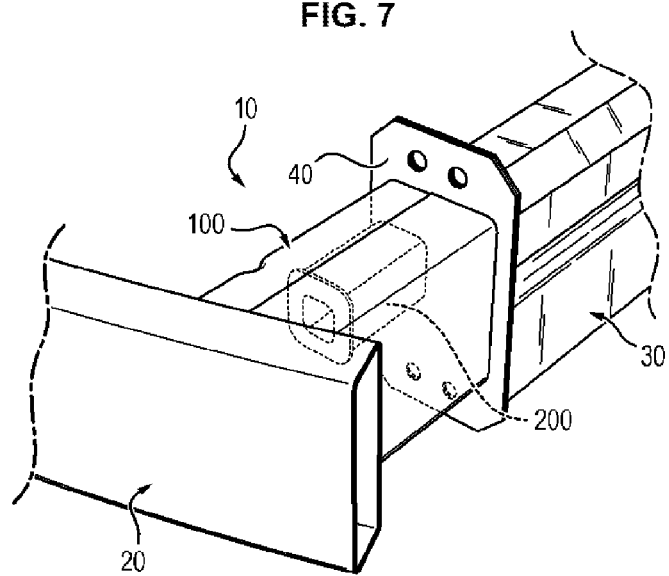
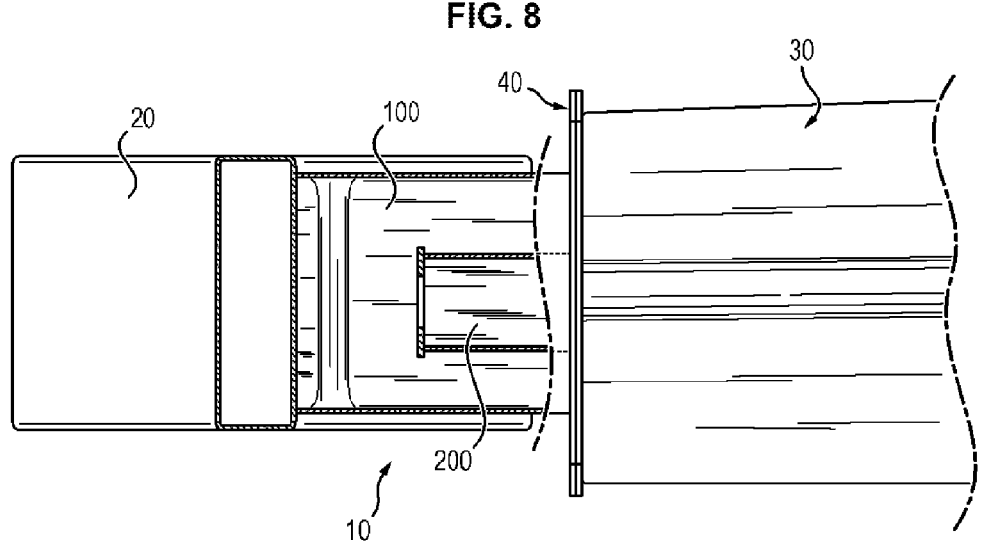

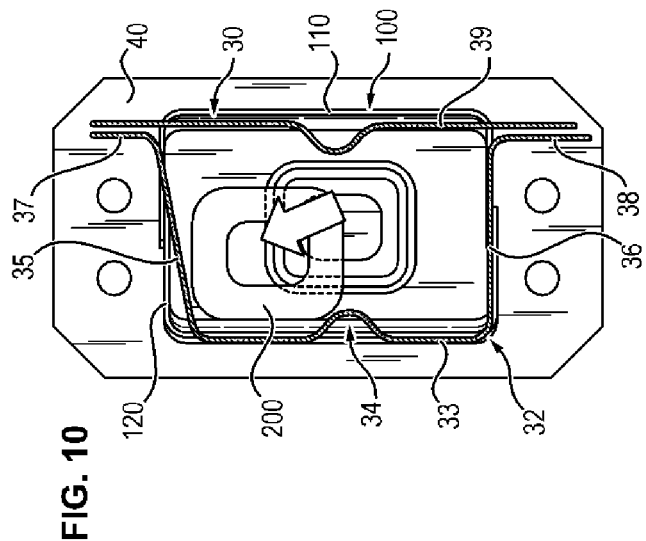
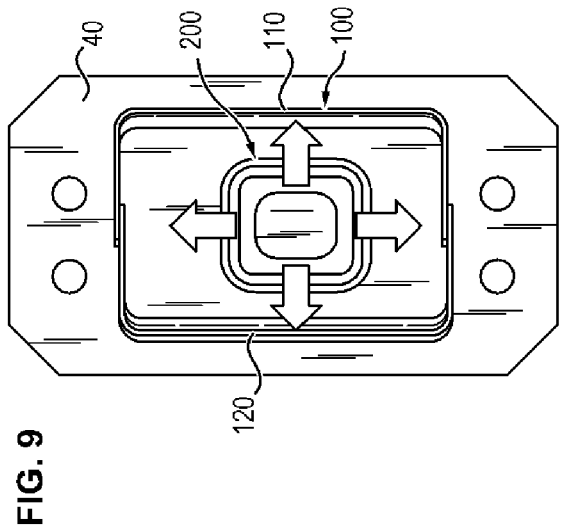
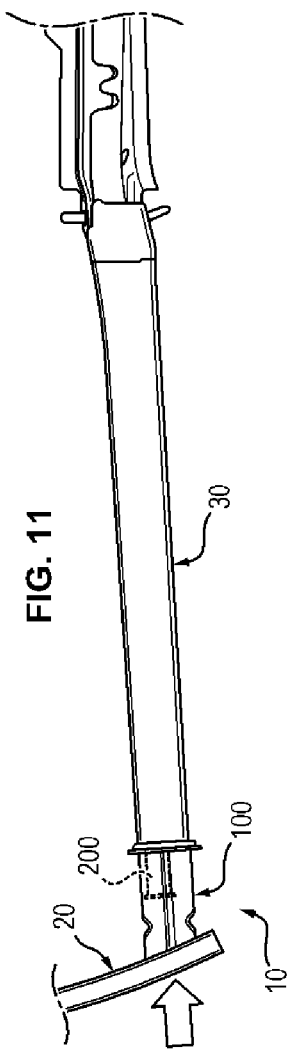

SHOCK ABSORBER SYSTEM FOR A VEHICLE

FIELD OF THE INVENTION

The present invention relates to the field of shock absorber systems for vehicles.

STATE OF THE ART

A number of pieces that deform to absorb the energy from impacts on vehicles, in order to limit the transmission of this energy towards the passenger compartment, already exist.

Examples of known absorber systems are found in the following documents: DE 10327604, US 2004/0060791, WO 2006/042974, DE 19745656, FR 2803571, FR 2844321, US 2002/0101086, FR 1530799, US 2005/0211520, FR 2903061, US 2005/0269824, US 2003/0057719, FR 2888545, US 2013/0119705, FR 2876646.

Documents US 2007/052258, GB 2344794 and WO 00/03909 propose absorbing systems comprising a main unit and a secondary unit shorter in length than the main unit, adapted subjected to loads as a complement of the main unit, after a first deformation phase of the main unit, when the system receives an impact with a second energy level greater than a first energy operating the initial deformation of the main unit.

OBJECT OF THE INVENTION

The present invention aims to improve existing absorber systems.

Thus the invention proposes a shock absorber system (or assembly) for a vehicle comprising a main unit adapted to be deformed in the event of an impact with a first energy level and a secondary unit shorter in length than the main unit, adapted to be subjected to loads as a complement of the main unit, after a first deformation phase of the main unit, when the system receives an impact with a second energy level greater than the first, the secondary unit being configured to orient the resultant of a force applied on a downstream structure in a direction not parallel to the longitudinal axis of this downstream structure.

The structure according to the present invention enables the deformations to be limited to the main unit for all impacts with an energy level that does not reach the second energy level. In this case, repairs can be easily carried out and at a low cost by simply replacing the main unit, as the secondary unit, as well as the downstream structures, have not been damaged.

Whilst subjected to a load, the secondary unit may deform under the effect of an impact with a second energy level and/or transmit the resultant stress to a downstream structural piece. The secondary unit has and/or induces a deformation axis that is different from that of the main unit. The secondary unit therefore may be adapted to completely or partially offset an asymmetry of the level of strength of the assembly of the relevant downstream structure, and/or to orient a resultant force applied to a downstream structure in a direction not parallel to the direction of application of the force generated by the impact, which typically is also not parallel to a longitudinal axis of this downstream structure.

According to a first embodiment of the invention, the secondary unit is eccentric relative to the main unit.

According to a second embodiment of the invention, the secondary unit is centered relative to the main unit.

Advantageously, the secondary unit has a geometry homothetic to that of the main unit.

Advantageously, the secondary unit has a geometry that is suitable for inducing a deformation axis that is different from that of the main unit. The geometry of the secondary unit suitable for inducing a deformation axis that is different from that of the main unit includes, for example, at least one of:
- a wall thickness that is different between two walls of the secondary unit,
- a groove extending along a wall of the secondary unit,
- a cross-section in the shape of an irregular hexagon,
- a U-shaped cross-section,
- an assembly of a first and second pieces, each one provided with a pair of fins through which the first and second pieces are fastened to each other such that they form the secondary unit,
- a tetragonal cross-section with at least two adjacent walls of the secondary unit that are not orthogonal to each other,
- an overlap of edges of a plate from which the secondary unit is formed by folding,
- a weld between them of the edges of a plate from which the secondary unit is formed by folding.

Advantageously, the secondary unit has cut-outs to induce a deformation axis that is different to that of the main unit.

Advantageously, the secondary unit has a primer element configured to prime the deformation of the secondary unit in a deformation axis different from that of the main unit. The primer element is, for example, a pre-deformation of the secondary unit and/or openings placed on the edges of the secondary unit.

Advantageously, the secondary unit has an area of lower mechanical strength obtained through heat-treating the secondary unit.

Advantageously, the secondary unit has reinforcements.

Advantageously, the secondary unit comprises a main body formed from a first material and a secondary element formed from a second material with mechanical characteristics that are different to that of the first material.

The secondary unit is preferably housed in the main unit.

According to an embodiment of the invention, the secondary unit is adapted to be deformed under the effect of the impact with a second energy level. According to a variant, the secondary unit is adapted to transmit a resulting force to a downstream structural piece.

The main unit and/or the secondary unit are, for example, made of steel.

At least one of the units is, for example, formed by a tubular piece centered on a longitudinal axis parallel to the direction of application of a force under the effect of an impact.

Advantageously, the system comprises, for example, several secondary units nested inside the main unit.

At least one of the units has, for example, a straight rectangular cross-section.

At least one of the units has, for example, a constant cross-section throughout the entire length thereof along its longitudinal axis O-O and a constant thickness along the entire length thereof according to this axis.

At least one of the units has, for example, a cross-section and/or a thickness that changes along the length of the unit.

The secondary unit is, for example, formed by a piece with an overall thickness greater than that of the main unit in order to have a resistance to deformation when under longitudinal compression, greater than that of the main unit.

Advantageously, the system is placed between an end of a bumper crossbar and a front end of a front beam framing an engine compartment of the vehicle.

Advantageously, the secondary unit is placed in an eccentric position inside the main unit, in a position adjacent to the inner face of the downstream beam.

DESCRIPTION OF THE FIGURES

Other characteristics, objectives and advantages of the present invention shall become clear after reading the detailed description below and with regards to the attached drawings provided by way of non-limiting examples and in which:

FIG. 1 shows a schematic perspective view, at rest, of an absorber system according to a first embodiment of the invention, according to a partially exploded view of the main unit in order to show the secondary unit, FIGS. 2 and 3 show similar schematic views of the same absorber system at two successive stages of deformation, FIG. 7 shows a perspective view of a particular embodiment of the first embodiment of the invention, FIG. 8 shows a view of the same particular embodiment according to a side view and partial longitudinal cross-section, FIG. 9 shows a view of the same particular embodiment according to a transversal cross-section and illustrates several possibilities for making the secondary unit eccentric inside the main unit, FIG. 10 shows a similar view to that of FIG. 9 illustrating the secondary unit in two alternative positions, centered and eccentric, as well as the section of a downstream piece formed by a front beam of the vehicle being superimposed thereon, FIG. 11 shows a top schematic view of an assembly according to the first embodiment of the invention and illustrates the application of force on a downstream structural piece formed by a beam linked to a secondary unit that is eccentric inside the main unit.

DETAILED DESCRIPTION

As previously stated, the invention relates to a shock absorber system 10 for a vehicle comprising a main unit 100 adapted to be deformed in the event of an impact with a first energy level and a secondary unit 200 shorter in length adapted to be subjected to loads as a complement of the main unit 100, after a first deformation phase of the main unit 100, when the system receives an impact with a second energy level greater than the first, the secondary unit 200 being configured to orient the resultant of a force applied on a downstream structure 30 in a direction not parallel to the longitudinal axis of this downstream structure 30.

Figure 6:
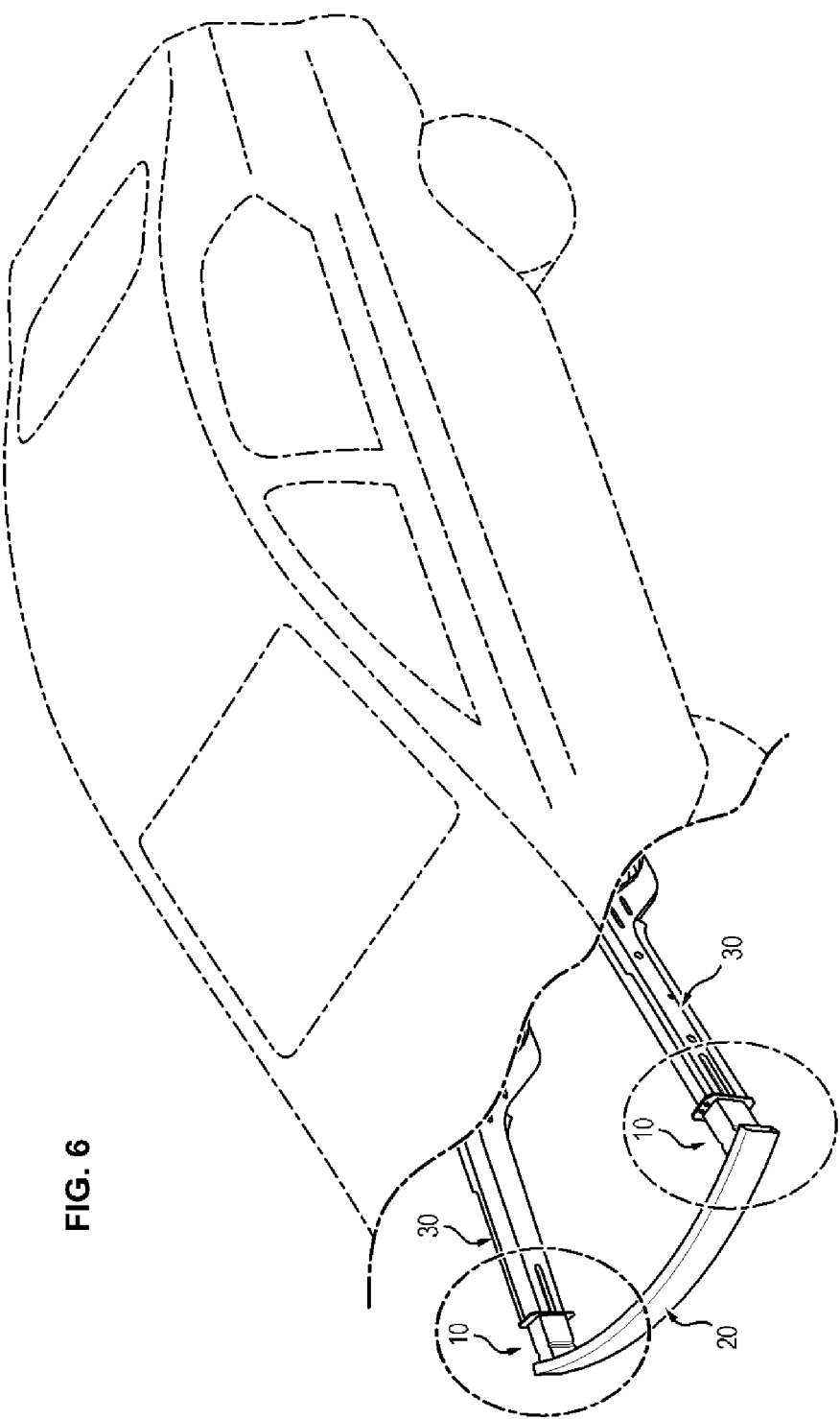
Figure 12A:
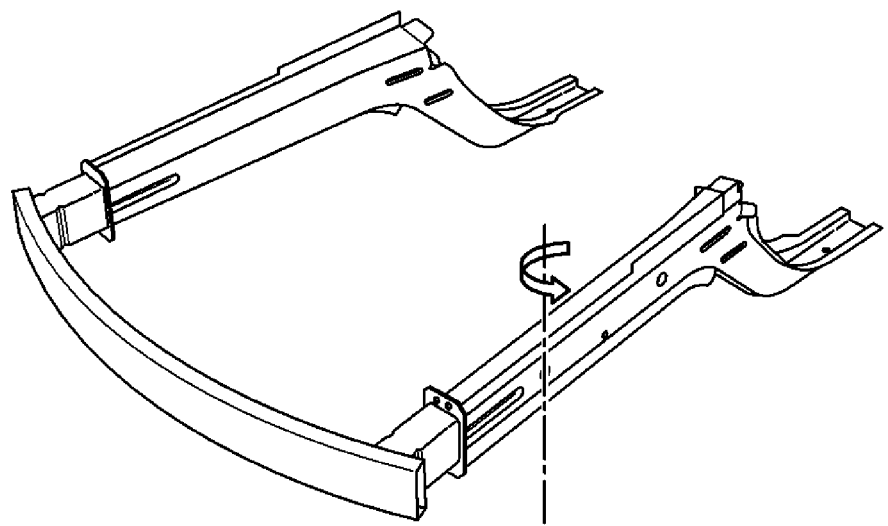
FIGS. 12A and 12B show schematic views of an assembly composed of a front bumper crossbar connected to front beams through absorber systems according to the first embodiment of the invention and respectively illustrating a bending moment according to a vertical axis Z that is transversal to the longitudinal axis of a front beam, for FIG. 12A, and a bending moment according to a horizontal axis Y that is transversal to the longitudinal axis of the beam, for FIG. 12B.
Figure 12B:
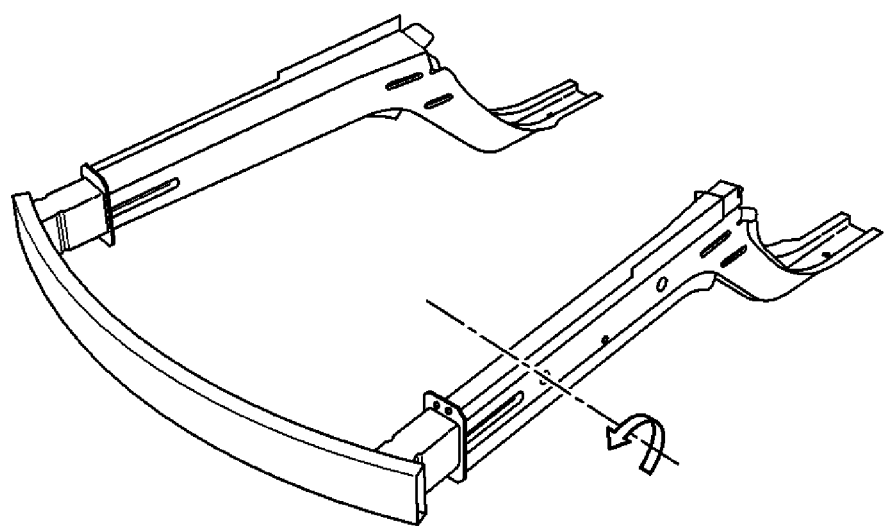

The absorber system 10, made up of the combination of the main unit 100 and the secondary unit 200, is placed between an upstream structural piece 20, for example a bumper crossbar, and a downstream structural piece 30, for example the front end of a beam of a vehicle. FIG. 6 shows two absorber systems 10 respectively placed between the ends of a bumper crossbar 20 and the front ends of front beams 30 framing the engine compartment.

Preferably, the impacts with first and second energy levels correspond to different events. In other words, the impacts with first and second energy levels are not involved consecutively. It concerns two different impact scenarios. The energy level of the impacts varies depending on the level of speed and/or mass of the vehicle when the event or impact scenario occurs. The impact that corresponds to the second energy level therefore corresponds to a first impact event or to a first impact scenario during which the vehicle is at a higher level of speed and/or has a higher mass, whilst the impact that corresponds to a first level of energy corresponds to a second event of a second scenario during which the vehicle is at a lower level of speed and/or has a lower mass.

Preferably, the secondary unit 200 has and/or induces a deformation axis that is different from that of the main unit 100. "The secondary unit 200 has a deformation axis that is different from that of the main unit 100" is understood as the fact that the secondary unit 200 is configured to deform when axially compressed and/or bent according to an axis that is different from that of the main unit 100. "The secondary unit 200 induces a deformation axis that is different from that of the main unit 100" is understood as the fact that the secondary unit 200 is configured to transfer a force to the downstream structural piece 30 according to a deformation axis that is different from that of the main unit 100. In this case, the secondary unit 200 may or may not deform. The foregoing arrangements enable the secondary unit 200 to apply a bending moment on the downstream structure 30 that then deforms according to an axis different from that of the main unit 100 (one or several hinge effects).

Advantageously, the secondary unit 200 is configured to orient the resultant of a force applied on a downstream structure 30 in a direction that is not parallel to the application direction of the force due to the impact and typically being made in a direction not parallel to the longitudinal axis of this downstream structure 30. In particular, the portion of force transmitted by the secondary unit 200 to the downstream structure 30, when this secondary unit 200 is subjected to a load, is not parallel to the longitudinal axis O-O.

Advantageously, the secondary unit 200 is configured to offset an asymmetry of the level of strength of the assembly of the relevant downstream structure 30.

The secondary unit 200, shorter in length than the main unit 100, may be placed on the outside of the main unit 100. Nevertheless, the secondary unit 200 is preferably housed inside the main unit 100, as may be seen in FIG. 1.

According to the particular embodiments shown in FIGS. 1 to 18, the main unit 100 is formed by a tubular piece with a rectangular cross-section centered on a longitudinal axis O-O generally perpendicular to the contact face between the main unit 100 and the upstream structural piece 20, that is to say, generally parallel to the direction of application of a force under the effect of a front impact.

The main unit 100 thus has two horizontal walls 102 and 104 linked by two vertical walls 106 and 108.

Advantageously, the main unit 100 is formed from a metal, for example from steel. Of course, the main unit 100 is not limited to the particular embodiment shown and may have a straight cross-section, transversal to the longitudinal axis O-O, different to a rectangle, for example polygonal, circular, ovoid or other, including an open cross-section, for example C-shaped.

According to the representations provided in FIGS. 1 to 18, the main unit 100 has a constant cross-section along the entire length thereof along the longitudinal axis O-O and a constant thickness along the entire length thereof according to this axis. Alternatively, the cross-section and/or thickness of the main unit 100 may change along the length of the main unit according to the axis O-O.

According to a first embodiment of the invention, the secondary unit 200 is eccentric relative to the main unit 100.

According to the representation provided in FIG. 1, the secondary unit 200 has a geometry homothetic to that of the main unit 100. Thus, the secondary unit 200 is likewise formed by a tubular piece centered on an axis A-A of its own and which is parallel to the longitudinal axis O-O but different thereto.

According to the particular embodiment represented in FIG. 1, the secondary unit 200 is thus similarly formed of a tubular piece with a rectangular cross-section.

The secondary unit 200 thus has two horizontal walls 202 and 204 linked by two vertical walls 206 and 208.

It is preferably adjacent to the rear face of the main unit 100, abutting against the downstream structure 30.

Advantageously, the secondary unit 200 is likewise formed from a metal, for example from steel. Of course, the secondary unit 200 is not limited to the particular embodiment shown and may likewise have a straight cross-section, different to a rectangle, for example polygonal, circular, ovoid or other, including an open cross-section, for example C-shaped.

According to the representation provided in FIG. 1, the secondary unit 200 has a constant cross-section along the entire length thereof along the longitudinal axis AO-AO and a constant thickness along the entire length thereof according to this axis. Alternatively, the cross-section and/or thickness of the secondary unit 200 may change along the length thereof according to the axis AO-AO.

When the secondary unit 200 is placed outside the main unit 100, it has a straight cross-section greater than that of the main unit 100.

On the contrary, when the secondary unit 200 is placed inside the main unit 100, it has a straight cross-section that is smaller than that of the main unit 100, as may be seen in the attached figures.

By way of non-limiting example, the dimensions of the main unit 100 and the secondary unit 200 may be the following:

horizontal length L1 of the main unit 100 of approximately 127 mm, vertical height H1 of the main unit 100 of approximately 100 mm, horizontal width L1 of the main unit 100 of approximately 60 mm, horizontal length L2 of the secondary unit 200 of approximately 62 mm, vertical height H2 of the secondary unit 200 of approximately 40 mm, horizontal width L2 of the secondary unit 200 of approximately 20 mm, Each of the main 100 and secondary 200 units may be formed of a one-piece assembly or by itself by assembling several pieces.

Thus, according to a particular embodiment represented in the attached FIGS. 7 to 10, the main unit 100 is formed by assembling two C-shaped pieces 110, 120 mounted head to tail, with the concavities facing each other, in order to form, in combination, a tubular assembly with a rectangular cross-section.

However, according to the particular embodiment shown in the attached FIGS. 7 to 10, the secondary unit 200 is formed of a single piece and with a thickness greater than the main unit 100 in order to have a resistance to deformation when under longitudinal compression, greater than that of the main unit 100.

Whilst being subjected to a load, the secondary unit 200 may deform under the effect of an impact with a second energy level and/or transmit the resultant stress to a downstream structural piece.

The deformation of the main unit 100 under the effect of a front impact with a first energy level that does not reach the aforementioned second energy level has been schematically represented in the attached FIG. 2. Only the main unit 100 is deformed. Repairs can be easily carried out and at a low cost by simply replacing this single main unit 100, as the secondary unit 200, as well as the downstream structures 30, have not been damaged.

The deformation of the two units, main 100 and secondary 200, under the effect of a front impact with a higher energy level has been represented in FIG. 3. Indeed, the secondary unit 200 is also put under load when the main unit 100, after the deformation thereof, reaches a length equal to that of the secondary unit 200, to absorb the energy surplus as a result of the impact.

As previously stated according to the invention, the secondary unit 200 is not centered on the main unit 100. This eccentricity may be adapted to offset at least partially an asymmetry of the resistance level of the assembly of the relevant downstream structure 30 or even to orient the direction of application of a force on a downstream structure 30 in an oblique direction not parallel to the incident direction of the force and often being made not parallel to the longitudinal axis O-O of the downstream structure 30.

FIG. 9 shows a transversal cross-sectional view of an absorber system and illustrates several possibilities for making the secondary unit 200 eccentric inside the main unit 100. Indeed, the secondary unit 200 may be eccentric relative to the main unit 100 by staggering the axes O-O and A-A on the same horizontal plane, on the same vertical plane, and even all horizontal and vertical combinations, according to the particular configuration of the involved structure and the desired effect.

The straight cross-section of a beam 30, formed by the combination of a piece 32 with a hat-shaped cross-section and a cover piece 39, is shown schematically superimposed on FIG. 10. The piece 32 is formed by a bottom piece 33 having a central stiffening ridge 34 and two rabbets 37 and 38 that are parallel to the bottom piece 33 and connected thereto by orthogonal walls 35 and 36. The cover piece 39 encloses this piece 32 by overlapping the rabbets 37 and 38.

It will be understood that by the structure thereof, since such a beam 30 is not symmetrical with respect to the longitudinal axis O-O (the two walls 35 and 36 are not symmetrical in FIG. 10 and the rabbets 37 and 38 combined with the cover piece 39 are not symmetrical with the bottom piece 33), it exhibits an asymmetric resistance to deformation with respect to a longitudinal axis O-O corresponding to the geometric center of the beam.

By positioning the secondary unit 200 not in a centered position in the main unit 100, but rather in an eccentric position in the main unit 100, for example in the upper left corner according to the representation of FIG. 10, the direction of deformation of the beam 30 may be controlled, despite its asymmetry, and for example, by favoring the application of the force on the inner face of the beam 30 corresponding to the bottom piece 33 due to the adjacent position of the secondary unit 200, impose a distortion of the beam 30 towards the outside of the engine compartment. By thus loading the inner face of the beams or side rails 30, a spacing is favored between the two, limiting the risks for the passengers of a vehicle. This is shown schematically in FIG. 11 by arrows symbolizing the magnitude of the force, being longer on the inner face of the beam 30 than on the outer face thereof.

Likewise, by loading the beams 30 near the upper face thereof, the folding of these beams 30 downwards is favored and thus prevents the engine from moving upwards.

According to a non-limiting representation given in the attached figures, the interface between the front end of the beam 30 and the rear ends of the main 100 and secondary 200 units is realized with a plate 40 inserted perpendicularly to the axis O-O.

Figure 13A:
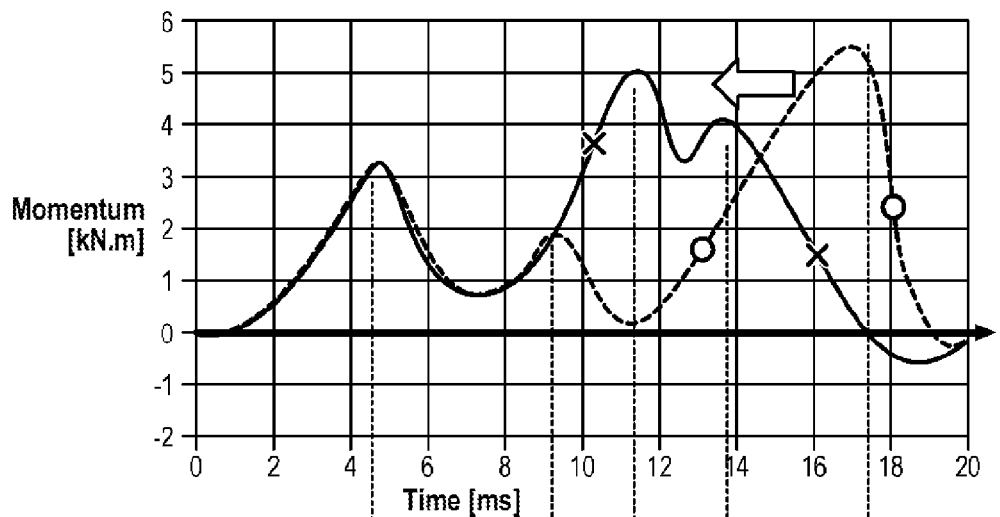
FIG. 13A shows the moments about the vertical axis Z as a function of time for an absorber system according to the first embodiment of the invention on the curve marked with a cross and for a classic absorber for the curve marked with a circle, respectively.

As previously shown, FIG. 13A shows the moments about the vertical axis Z as a function of time for an absorber system according to the first embodiment of the present invention on the curve marked with a cross and for a classic absorber for the curve marked with a circle, respectively.

Figure 13B:
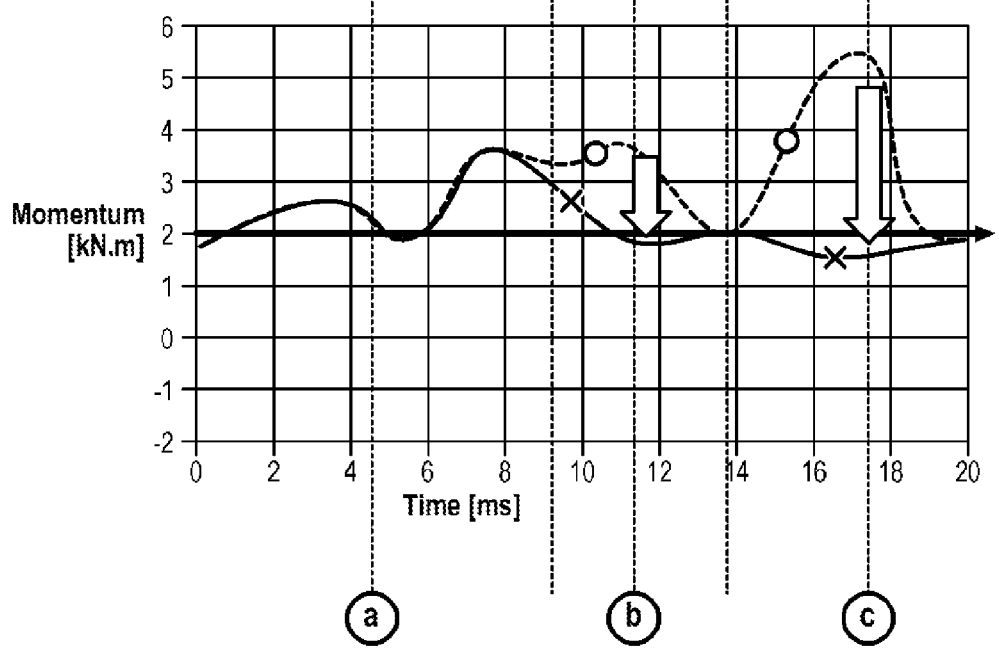
FIG. 13B shows the moments about the horizontal axis Y as a function of time for an absorber system according to the first embodiment of the invention on the curve marked with a cross and for a classic absorber for the curve marked with a circle, respectively, FIGS. 14 and 15 respectively show an absorber system known in the state of the art and an absorber system according to the first embodiment of the invention, inserted between one end of a bumper crossbar and one end of a front beam.
Figure 14:
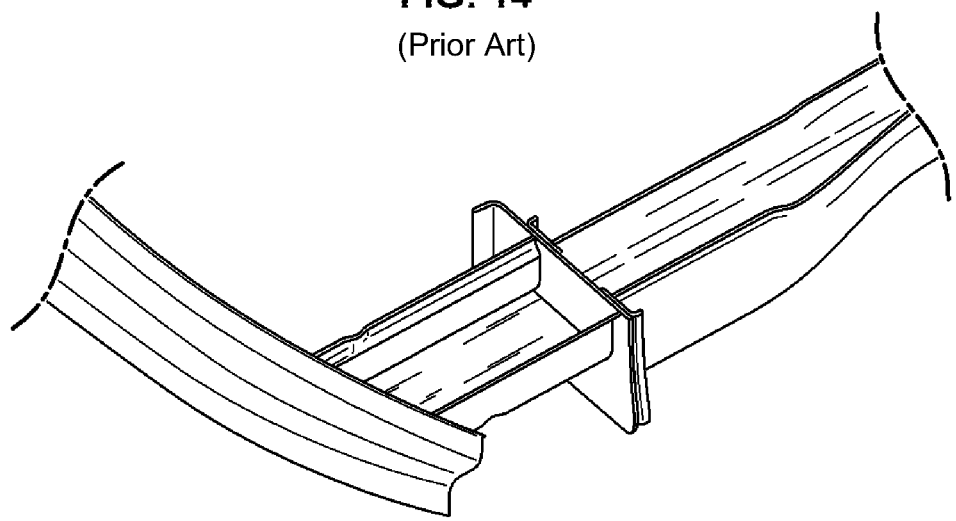
Figure 15:
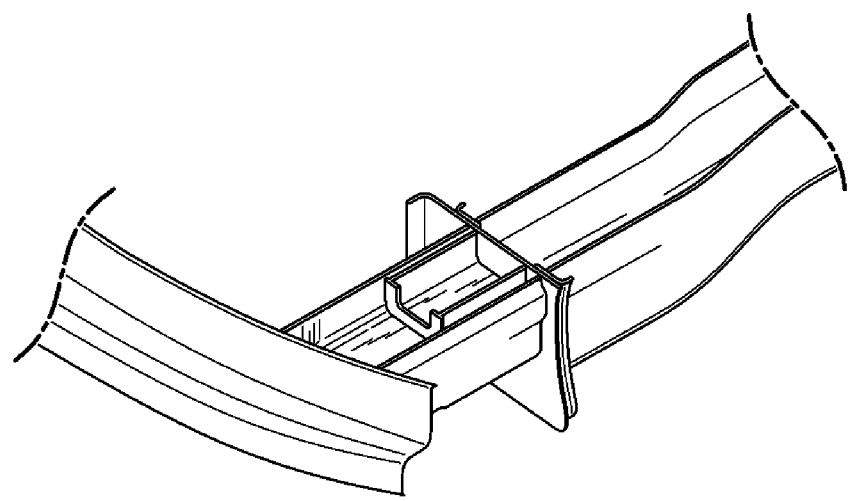

In this figure, as in FIG. 13B, the instances referenced as "a", "b" and "c" respectively correspond to the start of the deformation of the main unit 100 under the effect of an impact, at the beginning of the deformation of the secondary unit 200 under the effect of an impact reaching the second energy level and at the beginning of a folding of the beams 30 about the vertical axis Z.

The comparative examination of the two curves of FIG. 13A shows that, according to the invention, a faster bending of the beam 30 as well as smoothing of the moment are obtained, which reduces the force or deceleration that the passengers of a vehicle equipped with an absorber according to the invention are subjected to endure.

FIG. 13B in turn shows the moments about the horizontal axis Y as a function of time for an absorber system according to the present invention on the curve marked with a cross and for a classic absorber for the curve marked with a circle, respectively.

The comparative examination of the two curves illustrated in FIG. 13B shows that the absorbing system according to the present invention enables the resulting moment to be significantly smoothed and thus the bending risk about the horizontal axis Y. The risk of the engine rising is thus reduced, or even zero.

Figure 16A:
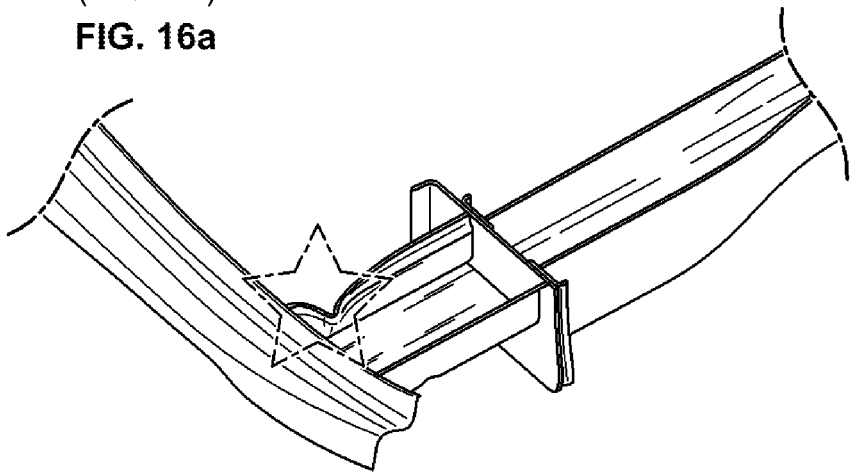
FIGS. 16a, 16b and 16c show the deformations of the absorber system according to the state of the art illustrated in FIG. 14 at three instances a, b and c identified on FIGS. 13A and 13B whilst
Figure 16B:
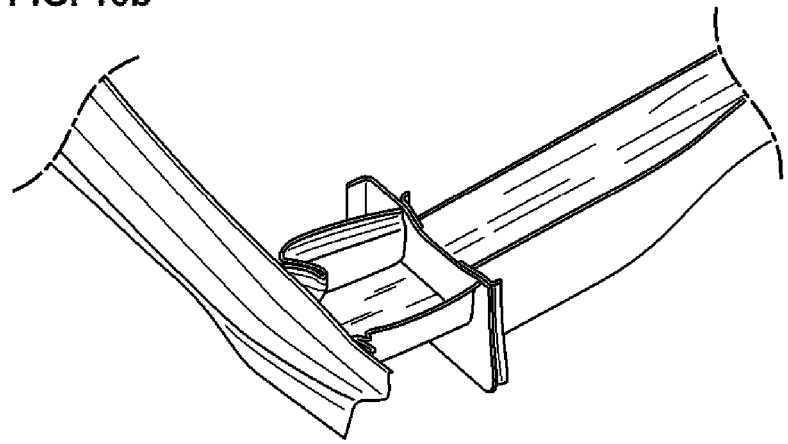
Figure 16C:
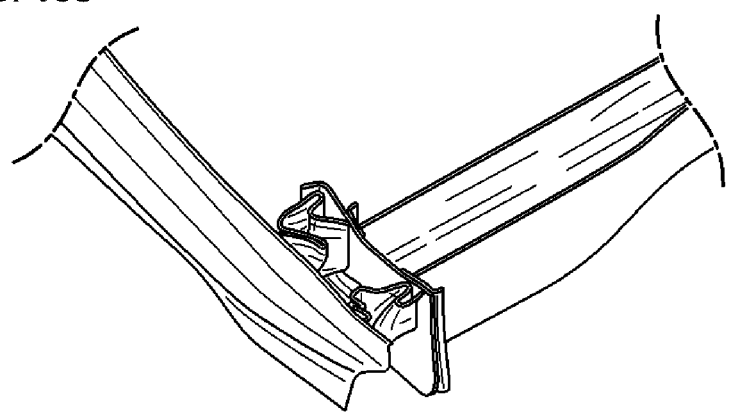
Figure 17A:
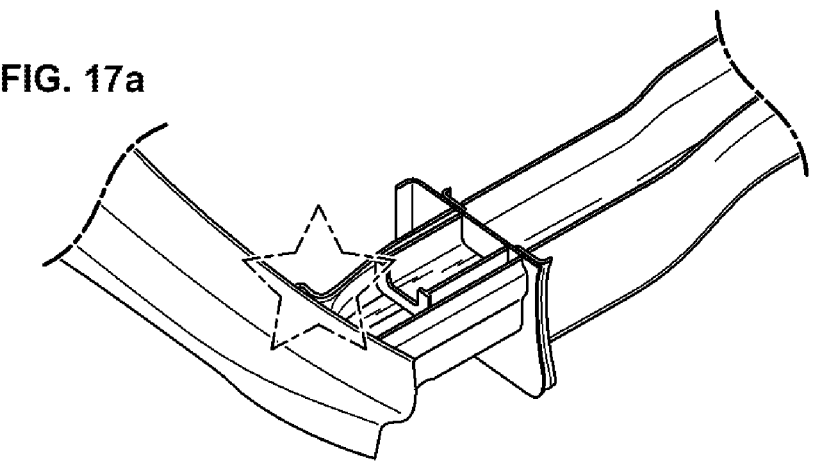
FIGS. 17a, 17b and 17c show the deformations of the absorber system according to the first embodiment of the invention illustrated in FIG. 15 at three identical instances a, b and c identified on FIGS. 13A and 13B, FIGS. 18a to 18h show a schematic perspective view, at rest, of an absorber system according to a second embodiment of the invention, according to a partially exploded view of the main unit in order to show the secondary unit.
Figure 17B:
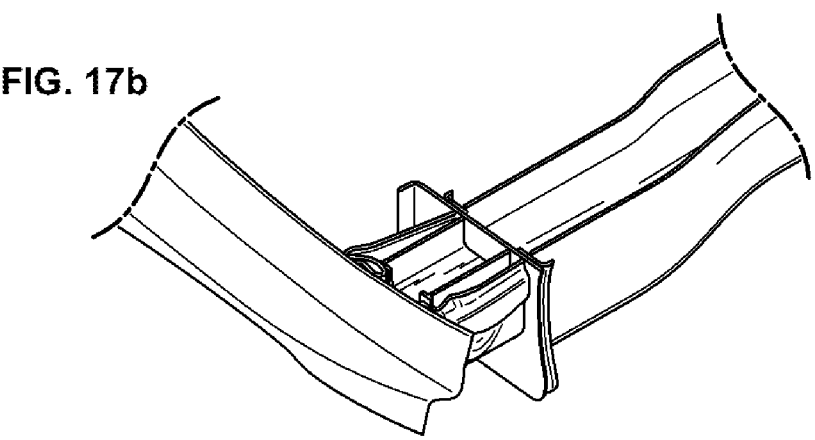
Figure 17C:
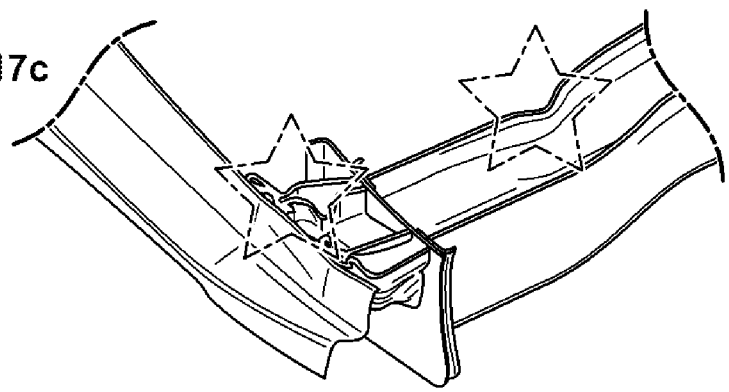

The comparative examination of FIGS. 16a, 16b and 16c that correspond to the state of the art and of FIGS. 17a, 17b and 17c that correspond to the invention, shows that due to the moment applied to the downstream structure due to the fact that the secondary unit induces a deformation axis different from that of the main unit, the invention enables a downstream structure bending about the vertical bending axis Z (thereby generating one or more hinge effects).

Naturally, the present invention is not limited to the embodiments described above but extends to any variant within the essence thereof.

Figure 4:
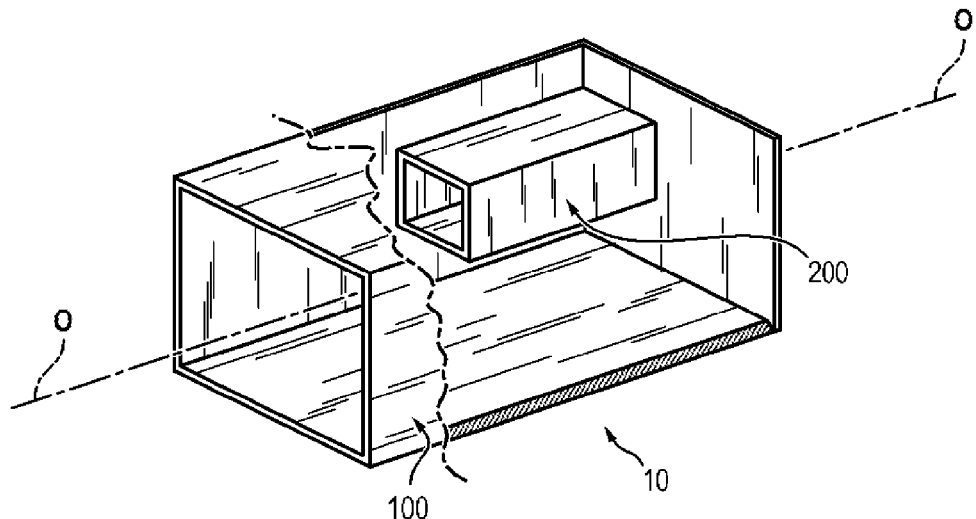
FIG. 4 shows a variant of an embodiment according to the first embodiment of the invention.
Figure 5:
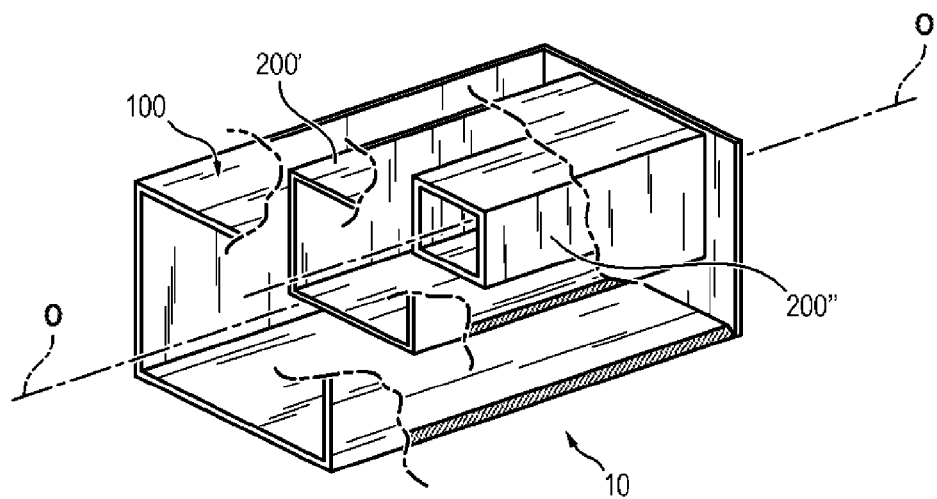
FIG. 5 shows a variant of an embodiment of an absorber system comprising three nested units, FIG. 6 schematically shows the base structure of a vehicle chassis in order to illustrate a preferred application of the first embodiment of the invention.

Thus, for example, as has been shown schematically in FIG. 5, the system according to the present invention may comprise several secondary units 200, for example, two secondary units 200' and 200" nested one inside the other and having, when appropriate, different lengths such that these secondary units 200' and 200" are successively subjected to a load according to the force level of the front impacts applied. As a result, depending on the particular embodiment shown in FIG. 5, the system according to the present invention comprises a main unit 100 that houses, nested, a first secondary unit 200' and a second secondary unit 200" with smaller dimensions, at least one of the secondary units 200', 200" being eccentric relative to the main unit 100. The secondary units 200' and 200" may themselves be centered with respect to each other or eccentric with respect to each other depending on the desired effect.

According to a second embodiment of the invention, the secondary unit 200 is centered on the main unit 100.

In the description below, the elements that are identical to those of the first embodiment have the same reference numbers.

The secondary unit 200 has, for example, a geometry suitable for inducing a deformation axis that is different from that of the main unit 100.

Figure 18A:
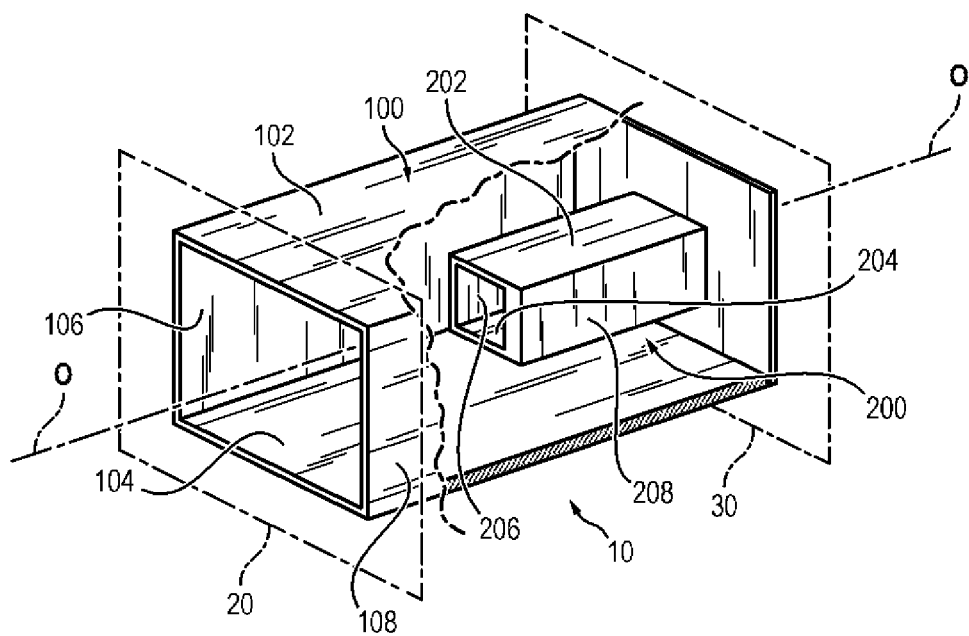

FIG. 18a shows that the secondary unit 200 has, for example, on at least one wall 208, a greater thickness than on the other walls 202, 204, 206.

Figure 18B:
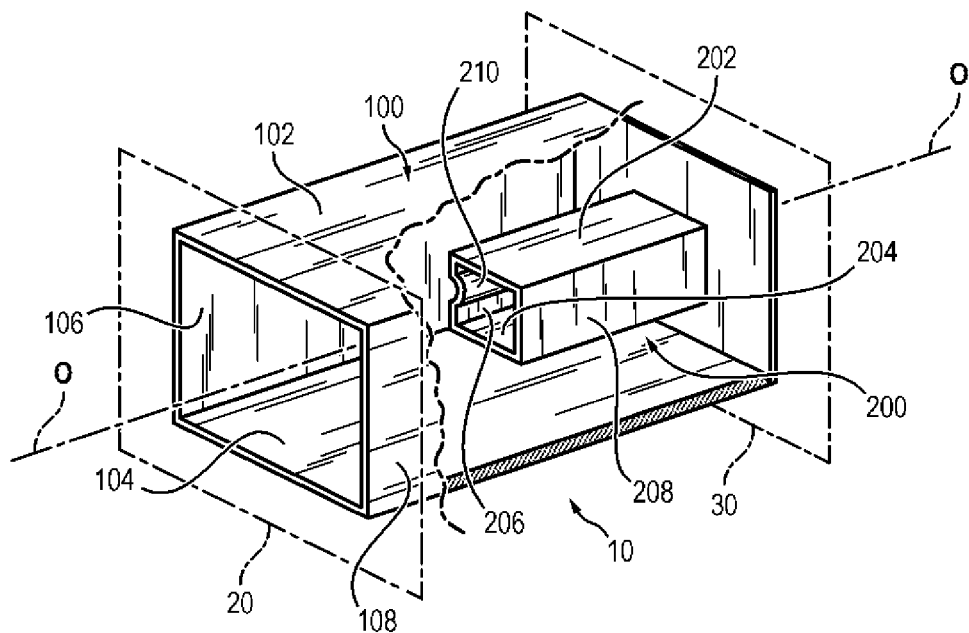

FIG. 18b shows that the secondary unit 200 has on at least one wall, a groove 210 extending parallel to the longitudinal axis O-O. The groove has, for example, a rounded cross-section oriented towards the inside of the piece.

Figure 18C:
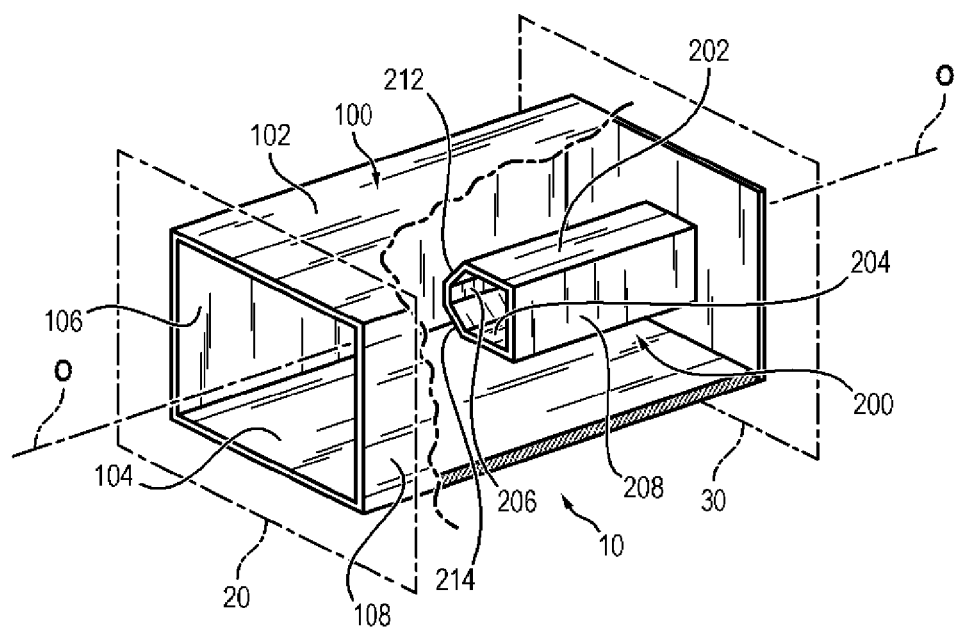
Figure 18D:
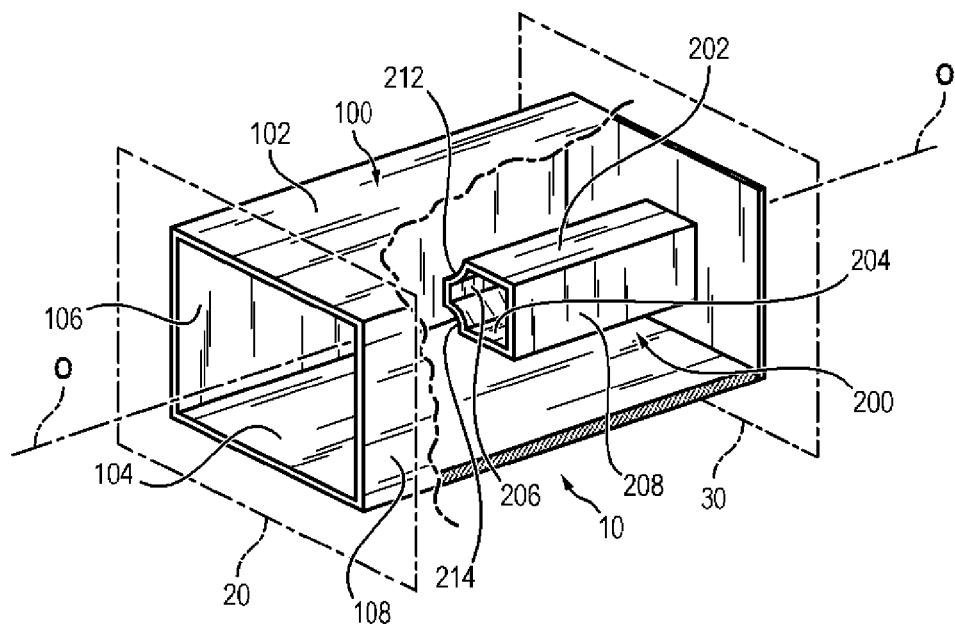

FIG. 18c shows that the secondary unit 200 is formed by a tubular piece with a non-regular hexagonal cross-section, centered on the longitudinal axis O-O. The tubular piece has, for example, a first, second and third pair of walls 206, 208; 202, 204; 212, 214. The two first walls 206, 208 are parallel to each other, and the two second walls 202, 204 are parallel to each other and substantially perpendicular to the two first walls 206, 208. The two second walls 202, 204 are adjacent to one of the first walls 208, and the two third walls 212, 214 are, on the one hand, each adjacent to one of the second walls 202, 204, and on the other hand, to the other of the first walls 206 and form an obtuse angle with each of the adjacent walls thereof, preferably of the same value. As an alternative illustrated in FIG. 18d, the third walls 212, 214 have a rounded cross-section oriented towards the inside of the piece.

Figure 18E:
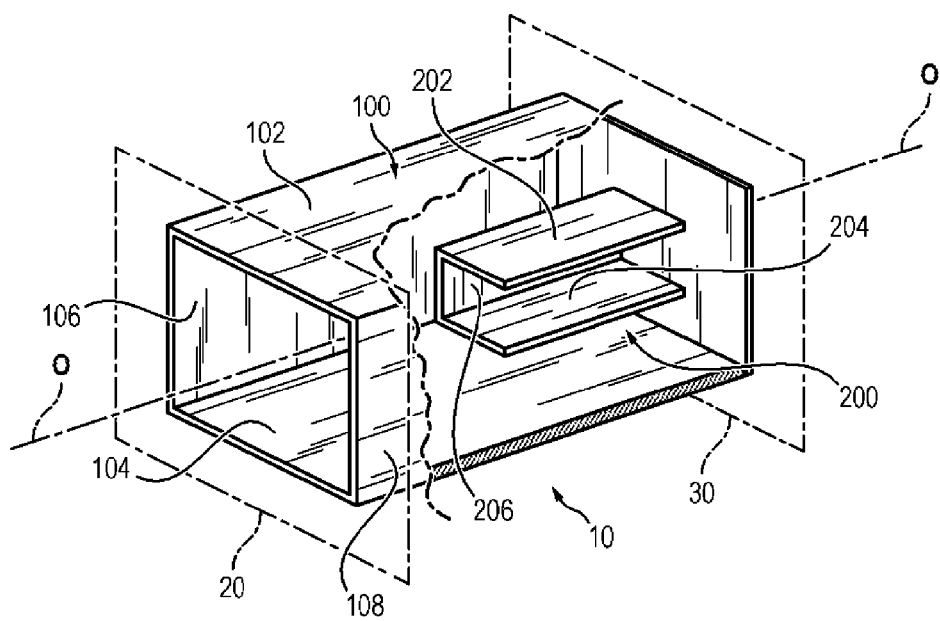

FIG. 18e shows that the secondary unit 200 is formed by an elongated piece having a U-shaped cross-section. The piece has, for example, a pair of walls 202, 204 that are parallel to each other and substantially perpendicular to a third wall 206.

Figure 18F:
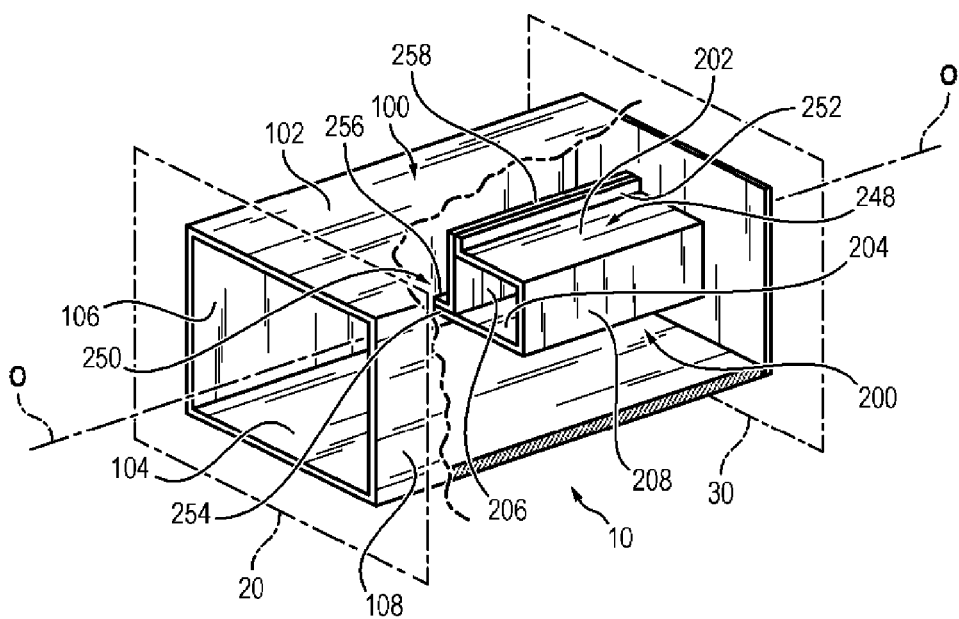

FIG. 18f shows that the secondary unit 200 is formed of a first elongated piece 248 having a generally U-shaped cross-section and a second generally elongated planar piece 250, the second piece 250 being mounted on the first piece 248 so as to form a generally tubular piece with rectangular cross-section centered on the longitudinal axis O-O. The first and second pieces 248, 250 are each provided with a pair of fins 252, 254; 256, 258 through which the first and second pieces 248, 250 are fastened to each other, in particular by welding. It is understood that by forming a dual thickness at the level of the fins 252, 254; 256, 258, during the assembly of the first and second pieces 248, 250, the secondary unit 200 has a deformation axis different from that of the main unit 100.

More specifically, it may be seen in FIG. 18f that the first piece 248 has a pair of walls 202, 204 that are parallel to each other and substantially perpendicular to a third wall 208. The first piece 248 further comprises two fins 252, 254, each extending along the extension of one of the first or second walls 202, 204, at the ends thereof opposite to the third wall 208, a first 252 of the fins generally extending orthogonal to the first wall 202 and parallel to the third wall 208, the second fin 254 generally extending on the same plane as the second wall 204 and orthogonal to the third wall 208. The second piece 250 comprises a wall 206 extended at opposite ends by a fin 256, 258, a first 256 of the fins generally extending orthogonal to the wall 206, the second fin 258 extending in the same plane as said wall 206. The second piece 250 is mounted on the first piece 248 such that the respective fins 252, 254; 256, 258 thereof face each other. More specifically, the first fin 252 of the first piece 248 is placed facing the second fin 258 of the second piece 250, whilst the second fin 254 of the first piece 248 is placed facing the first fin 256 of the second piece 250. The fins 252, 254; 256, 258 are, for example, fastened to each other by welding.

Figure 18G:
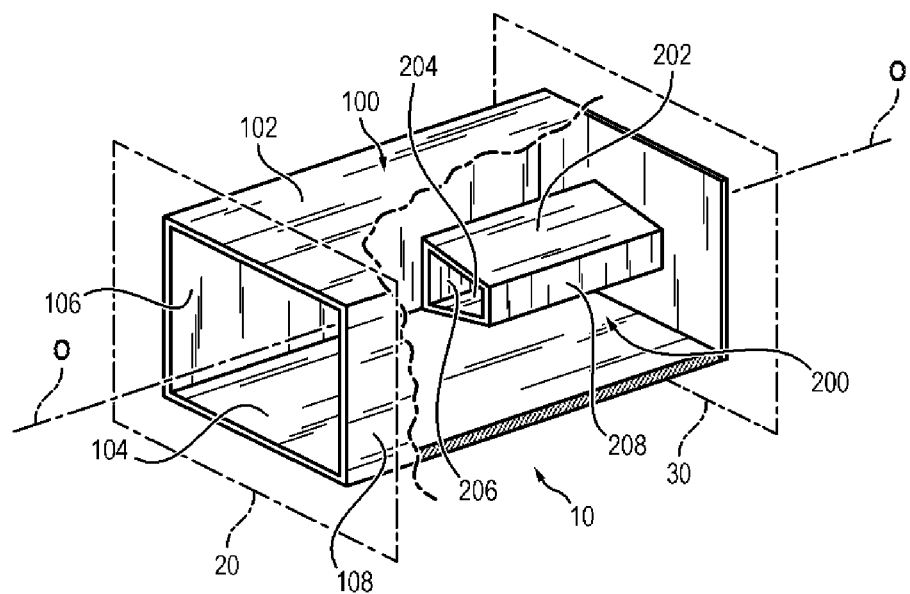

FIG. 18g shows that the secondary unit 200 is formed by a tubular piece centered on the longitudinal axis O-O with a tetragonal cross-section and comprising at least two walls 206, 204, 208, which are adjacent and not orthogonal to each other. In the example illustrated in FIG. 18g, the cross-section of the tubular piece is, for example, trapezoidal.

Figure 18H:
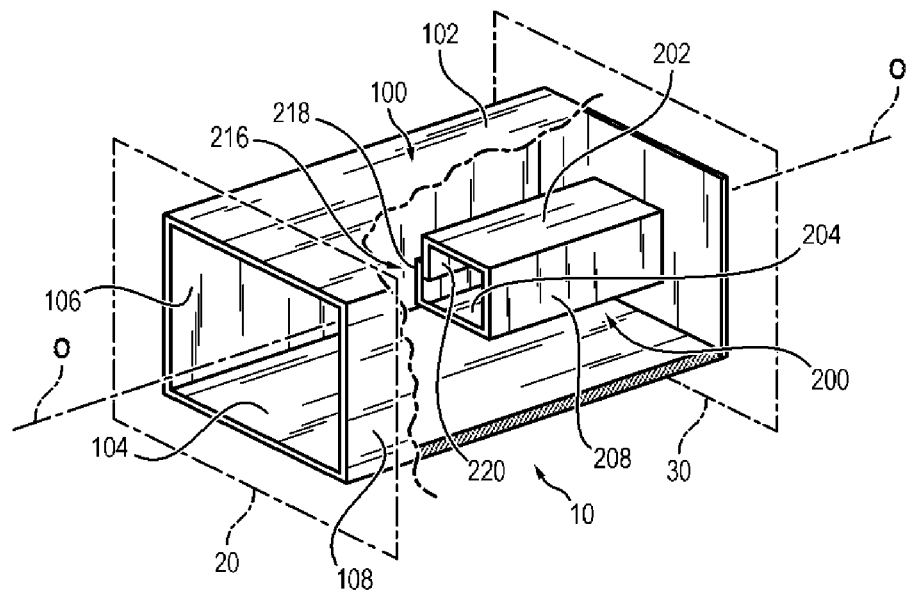

FIG. 18h shows that the secondary unit 200 is formed by a tubular piece centered on the longitudinal axis O-O carried out by the folding of a plate, the tube being closed by an overlap 216 of the edges 218, 220 of said plate. Alternatively, the tube is closed by welding the edges 218, 220 of the plate to each other.

Figure 19A:
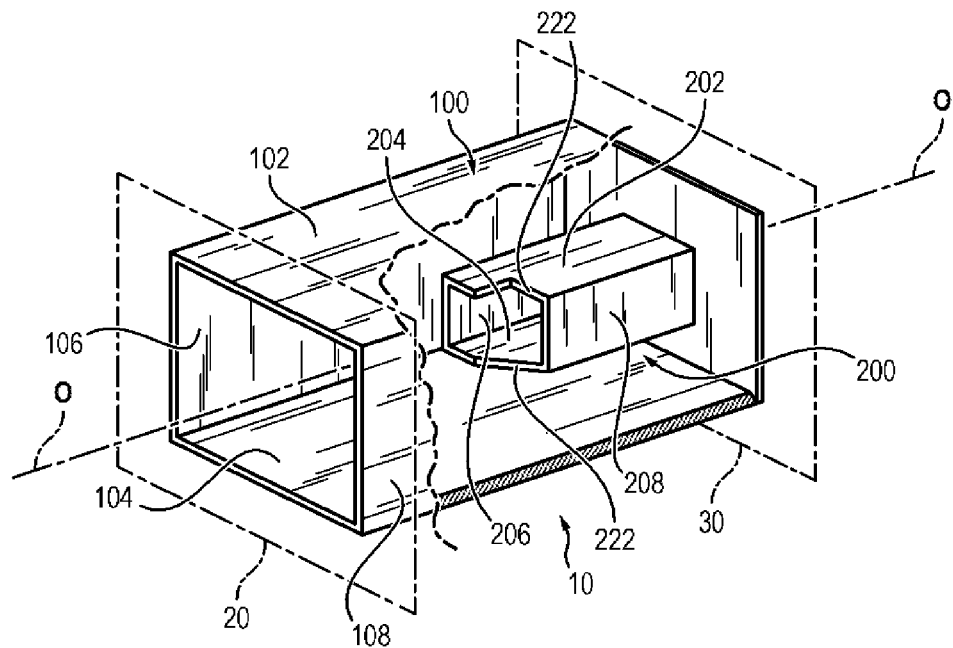
FIGS. 19a and 19b show a schematic view, at rest, of an absorber system according to a variant of the second embodiment of the invention.
Figure 19B:
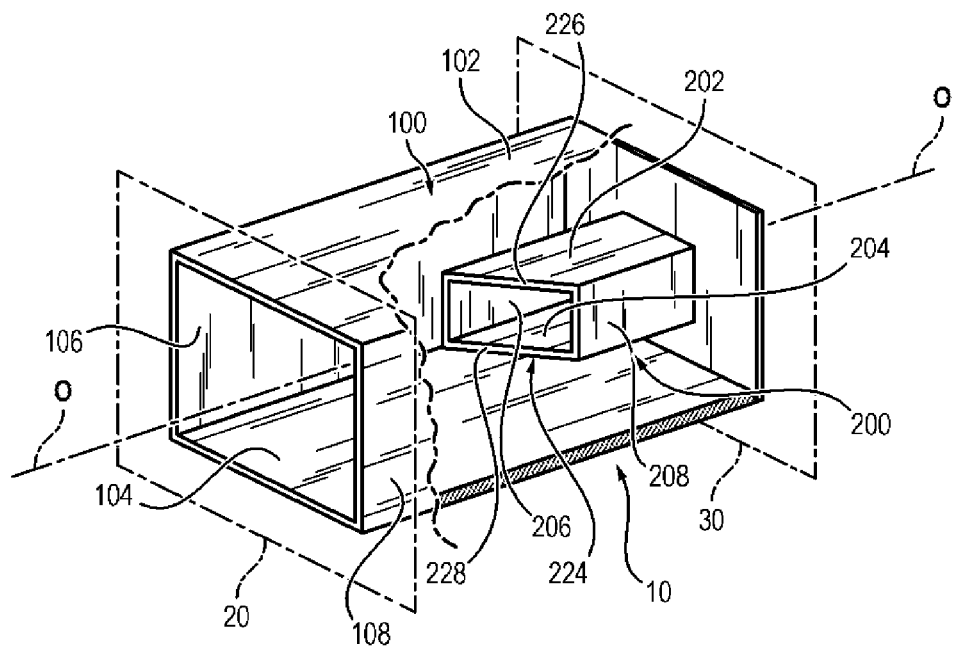

Alternatively, as shown in FIGS. 19a and 19b, the secondary unit 200 has, for example, cut-outs 222 to induce a deformation axis that is different from the main unit 100.

FIG. 19a shows that the edge of one of the walls of the secondary unit 200 is cut in steps, whilst the edge of another wall is cut obliquely with respect to the longitudinal axis O-O.

FIG. 19b shows that the secondary unit 200 is formed by an extended piece centered on the longitudinal axis O-O, and the longitudinal end 224 of which facing the upstream piece 20 is beveled relative to the longitudinal axis O-O. In the example shown in FIG. 19b, the edges 226, 228 of the horizontal walls 202, 204 are cut obliquely such that they do not form a right angle with the longitudinal axis O-O.

Alternatively, the secondary unit 200 has primer elements 230, 232 configured to prime the deformation of the piece in a deformation axis different from that of the main unit 100.

Figure 20A:
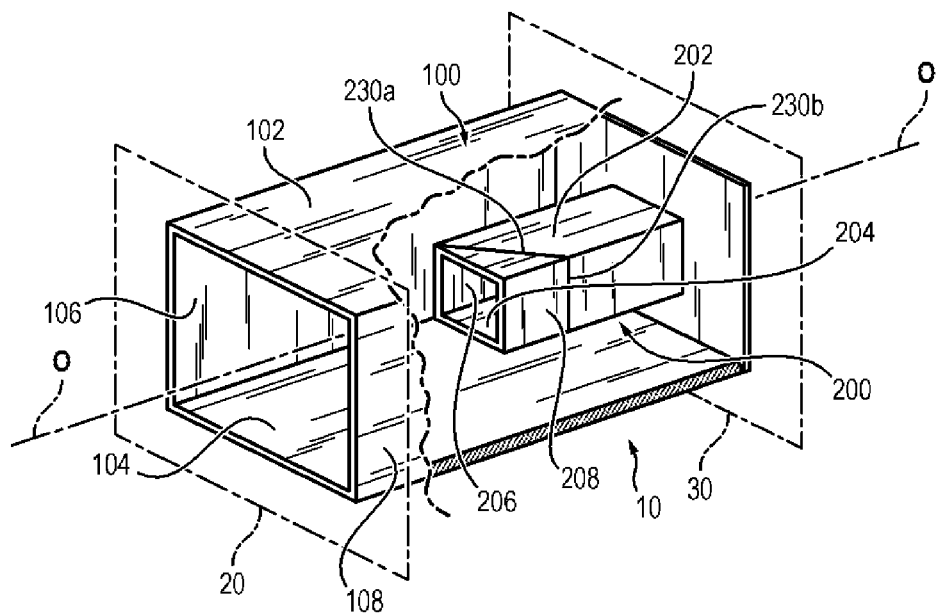
FIGS. 20a and 20b show a schematic view, at rest, of an absorber system according to another variant of the second embodiment of the invention.

FIG. 20a shows that the secondary unit 200 has pre-deformations 230 so as to prime the deformation of the piece in a deformation axis different from that of the main unit 100. In the example shown in FIG. 20a, the secondary unit 200 has on a first wall 202, a first deformation line 230a, and on a second adjacent wall 208, a second deformation line 230b. The first and second deformation lines 230a, 230b are preferably in continuity with each other.

Figure 20B:
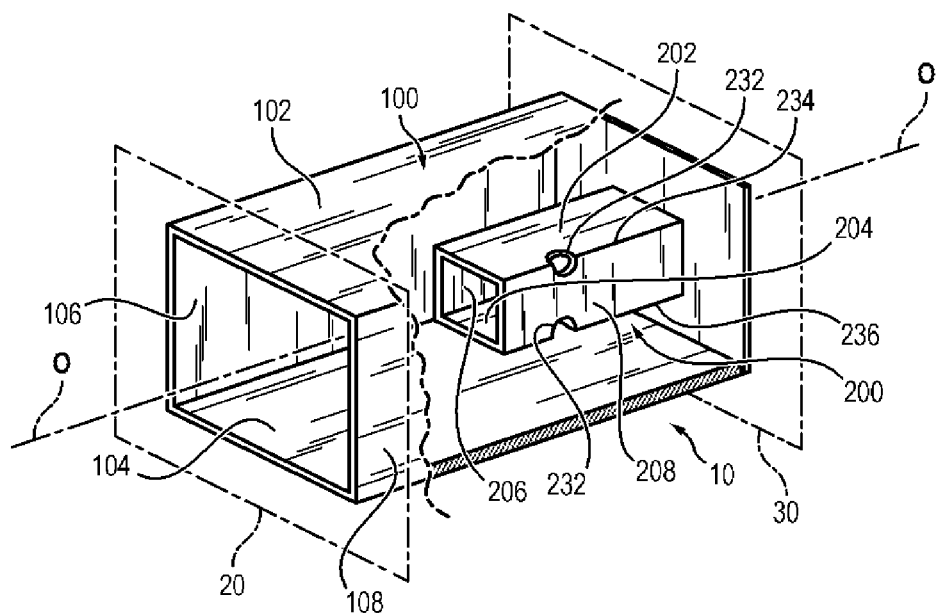

FIG. 20b shows that the secondary unit 200 has openings 232 arranged along the edge 234, 236 of the piece so as to prime the deformation of the piece in a deformation axis different from that of the main unit 100.

Figure 21:
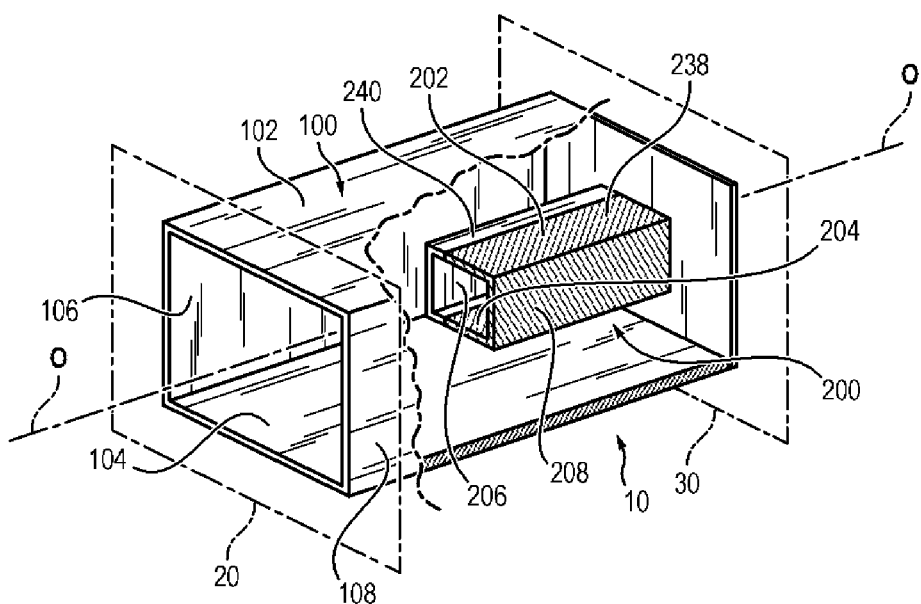
FIG. 21 shows a schematic view, at rest, of an absorber system according to another variant of the second embodiment of the invention.

Alternatively, as shown in FIG. 21, the secondary unit 200 is thermally treated so as to form at least one area that has lower mechanical strength 238 aimed at inducing a deformation axis different to that of the main unit 100. In particular, in the example illustrated in FIG. 21, the secondary unit 200 is formed by a tubular piece with a rectangular cross-section, said piece comprising an area of lower mechanical strength 238 on a first U-shaped portion of the cross-section, and an area of greater mechanical strength 240 on a second U-shaped portion of the cross-section of the piece.

Alternatively, the secondary unit 200 has reinforcements 242, 244 to induce a deformation axis that is different from that of the main unit 100. The reinforcements 242, 244 may be placed inside or outside the secondary unit 200

Figure 22A:
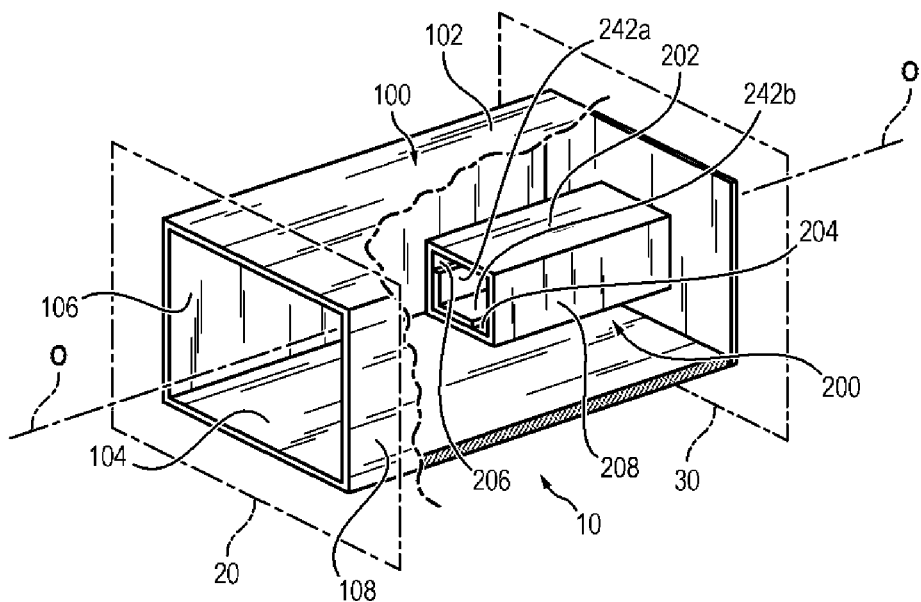
FIGS. 22a and 22b show a schematic view, at rest, of an absorber system according to another variant of the second embodiment of the invention.
Figure 22B:
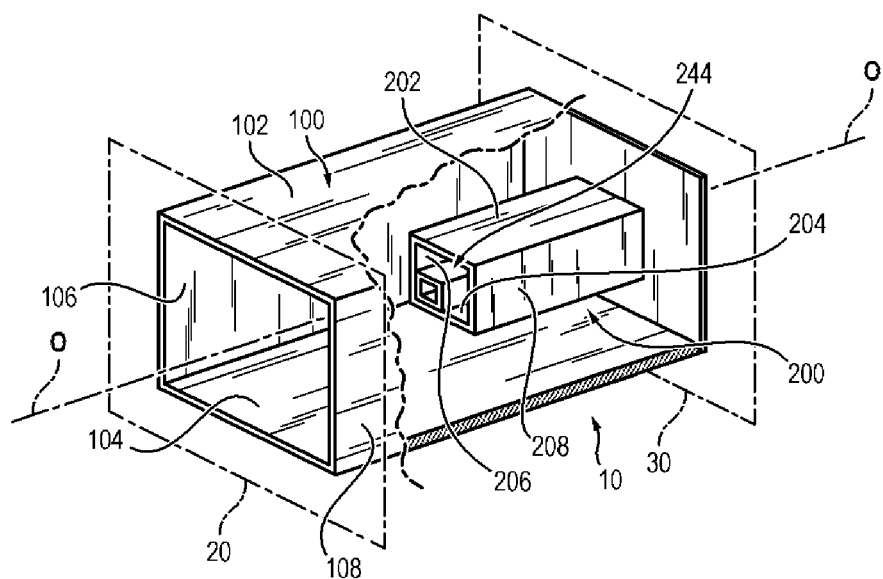

In the examples illustrated in FIGS. 22a and 22b, the reinforcements 242, 244 have a geometry homothetic to at least one portion of the secondary unit 200.

In particular, FIG. 22a shows that the secondary unit 200 is formed by a tubular piece with a rectangular cross-section and is complemented by a reinforcement piece 242 formed by two right-angled walls 242a, 242b, the reinforcement piece 242 being placed against two walls 206, 204 adjacent to each other of the secondary unit 200, so as to locally double the thickness of the walls 206, 204 of the secondary unit 200. The reinforcement piece 242 is, for example, fastened to the secondary unit 200 by bonding or welding.

FIG. 22b shows that the secondary unit 200 is formed by a tubular piece with a rectangular cross-section and is complemented by a tubular reinforcement piece 244 with a rectangular cross-section, placed inside the secondary unit 200 and eccentric relative to the longitudinal axis O-O. The reinforcement piece 244 may be the same length as the secondary unit 200 or shorter in length than the secondary unit 200. The reinforcement piece 244 may be fastened to the secondary unit 200.

Alternatively, the secondary unit 200 comprises a main body formed by a first material and a secondary element formed by a second material with mechanical characteristics different from those of the first material, namely Young's modulus, density, yield point or hardness (tensile strength). The main body is, for example, formed of steel, whilst the secondary element is formed of aluminum or a composite material.

Figure 23A:
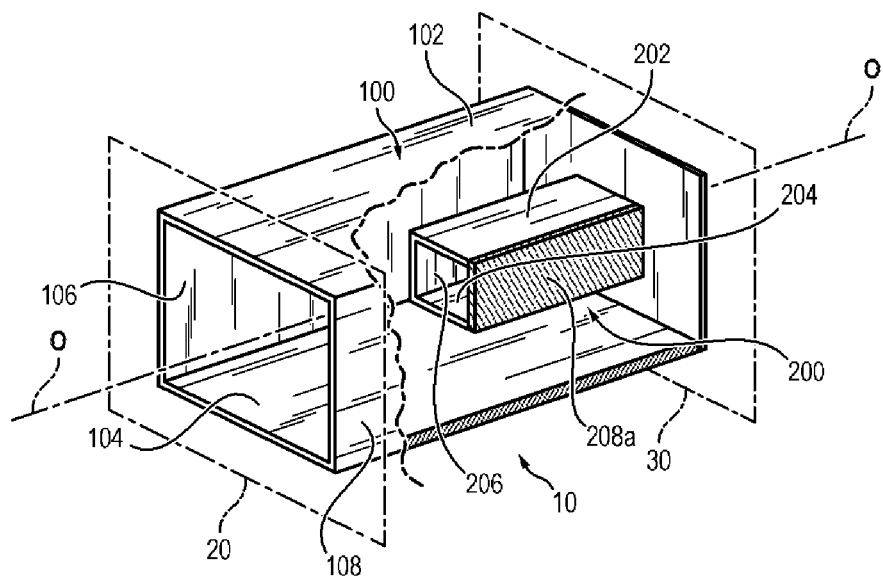
FIGS. 23a and 23b show a schematic view, at rest, of an absorber system according to another variant of the second embodiment of the invention.

FIG. 23a shows that the secondary unit 200 is formed of an elongated main body 202, 204, 206 with a U-shaped cross-section on which a plate 208a (secondary element), formed of a material different to that of the main body 202, 204, 206, is mounted so as to form a tubular piece centered with the longitudinal axis O-O.

Figure 23B:
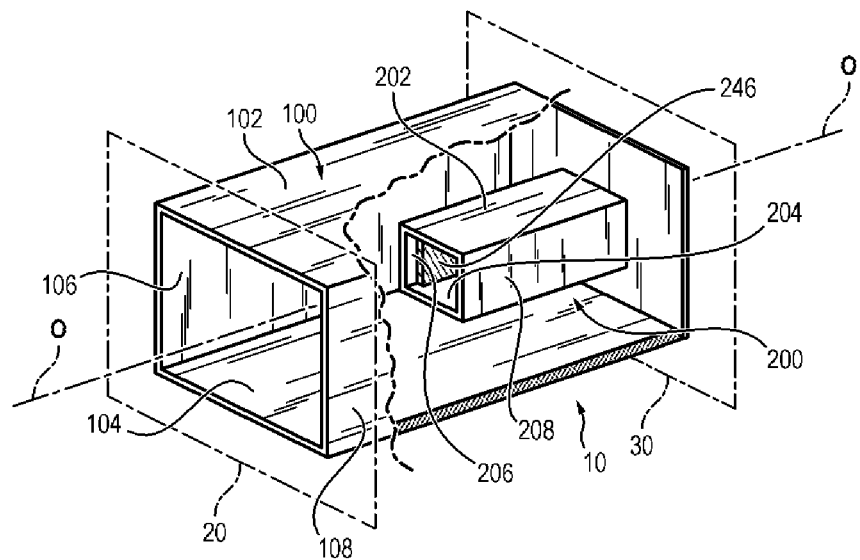

FIG. 23b shows that the secondary unit 200 is formed of a tubular main body 202, 204, 206 with a rectangular cross-section centered on the longitudinal axis O-O, the main body 202, 204, 206, 208 being complemented by a plate 246 (secondary element) formed by a material different from that of the main body 202, 204, 206, 208, placed against one of the walls 206 inside said body. The plate 246 is, for example, fastened to the wall by means of bonding, riveting, laser welding, spot welding or MIG-MAG welding ("Metal inert gas" and "Metal active gas").

A person skilled in the art will understand that the alternatives presented above may advantageously be combined.

A person skilled in the art will likewise understand that the first and second embodiments described above may advantageously be combined.

According to the different embodiments illustrated in the attached figures and described above, the secondary unit 200 rests against an element such as a plate 40, which serves as a support at the rear end of the main unit 100 opposite to the front end of this main unit 100 adjacent to the element that is supposed to receive the impact. However, the invention may also apply to any variant according to which the secondary unit 200 rests against an element that serves as a support at the front end of the main unit 100 adjacent to the element that is supposed to receive the impact, or in any intermediate position along the length of the main unit 100, since the length of the secondary unit 200 is smaller than that of the main unit 100. What is indeed important in the context of the invention is that the secondary unit 200 only begins to be put under deformation once the length of the main unit 100, initially longer, is reduced to that of the secondary unit 200.

Figure 24:
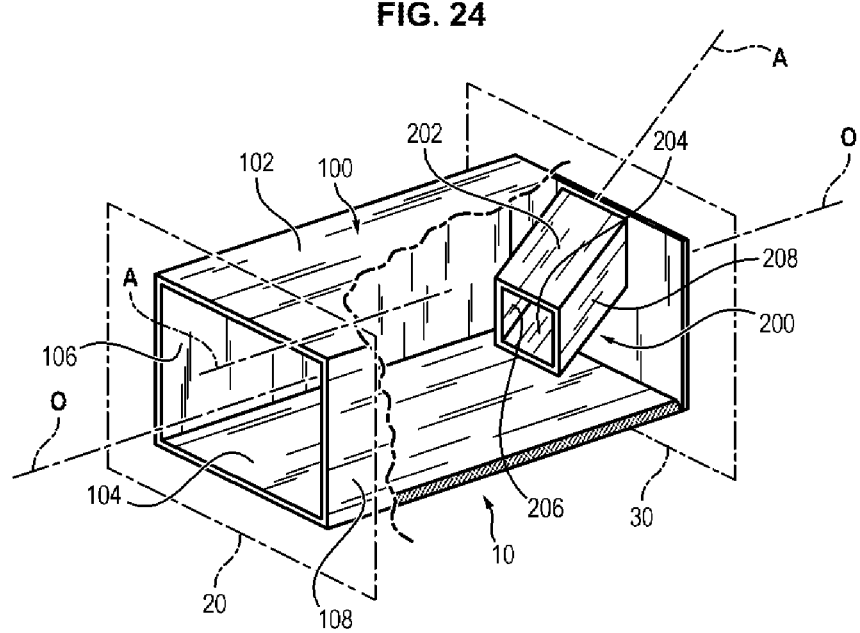
FIG. 24 shows a schematic view, at rest, of an absorber system according to a third embodiment of the invention.

According to the embodiments described above, the secondary unit 200 has a central axis parallel to a central axis of the main unit 100 on at least one portion of the length thereof. According to a third embodiment in compliance with the invention and illustrated in FIG. 24, the secondary unit 200 is centered on an oblique axis relative to the central axis of the main unit 100. This third embodiment is also compatible with all variants of the embodiments described above.

The invention claimed is:

1. A shock absorber system for a vehicle, comprising:
   a main unit adapted to deform in the event of an impact with a first energy level, wherein the first energy level produces a first deformation phase of the main unit; and
   a secondary unit, shorter in length than the main unit, adapted to be subjected to loads as a complement to the main unit after the first deformation phase of the main unit and when the system receives an impact with a second energy level greater than the first energy level and after the first deformation phase;
   wherein the secondary unit orients a force resultant applied on a downstream structure in a direction that is not parallel to a longitudinal axis of the downstream structure; and
   wherein the secondary unit has a geometry adapted to induce a deformation axis different from that of the main unit; and
   wherein the geometry of the secondary unit adapted to induce a deformation axis different from that of the main unit includes at least one of:
   a wall thickness that is different between two walls of the secondary unit,
   a groove extending along a wall of the secondary unit,
   a cross-section in the shape of an irregular hexagon,
   a U-shaped cross-section,
   an assembly of first and second pieces, each one provided with a pair of fins through which the first and second pieces are fastened to each other such that they form the secondary unit,
   a tetragonal cross-section with at least two adjacent walls of the secondary unit that are not orthogonal to each other,
   an overlap of edges of a plate from which the secondary unit is formed by folding, and
   a weld between edges of a plate from which the secondary unit is formed by folding.

2. The system according to claim 1, wherein the secondary unit is eccentric relative to the main unit.

3. The system according to claim 1, wherein the secondary unit is centered relative to the main unit.

4. The system according to claim 1, wherein the secondary unit has cut-outs to induce a deformation axis different from that of the main unit.

5. The system according to claim 1, wherein the secondary unit has a primer element to prime the deformation of the secondary unit in a deformation axis different from that of the main unit.

6. The system according to claim 5, wherein the primer element is a pre-deformation of the secondary unit and/or openings placed on edges of the secondary unit.

7. The system according to claim 1, wherein the secondary unit has an area of lower mechanical strength obtained through heat treating the secondary unit.

8. The system according to claim 1, wherein the secondary unit has reinforcements.

9. The system according to claim 1, wherein the secondary unit comprises a main body formed from a first material, and a secondary element formed from a second material with different mechanical characteristics to those of the first material.

10. The system according to claim 1, wherein the secondary unit is housed in the main unit.

11. The system according to claim 1, wherein the system comprises several secondary units nested in the main unit.

12. The system according to claim 1, wherein at least one of the main and secondary units has a straight rectangular cross-section.

13. The system according to claim 1, wherein the secondary unit is formed by a piece with an overall thickness greater than the main unit in order to have a resistance to deformation when under longitudinal compression, greater than that of the main unit.

14. The system according to claim 1, in combination with a bumper crossbar and a front end of a front beam framing an engine compartment of a vehicle, wherein the system is placed between an end of the bumper crossbar and the front end of the front beam.

15. The system according to claim 14, wherein the secondary unit is placed in an eccentric position inside the main unit, in a position adjacent to an inner face of the front beam.

\* \* \* \* \*